United States Patent [19]
Harte

[11] 3,928,923
[45] Dec. 30, 1975

[54] MATHEMATICAL BALANCE

[76] Inventor: James Richard Harte, 10 W. Concord, Kansas City, Mo. 64112

[22] Filed: Nov. 12, 1973

[21] Appl. No.: 415,242

[52] U.S. Cl. ............................................. 35/31 R
[51] Int. Cl.² ..................................... G09B 19/02
[58] Field of Search ............. 35/31 R, 31 D, 31 F; 273/123 R, 123 A

[56] References Cited
UNITED STATES PATENTS

| | | | |
|---|---|---|---|
| 1,649,578 | 11/1927 | Deming | 35/31 D UX |
| 1,719,108 | 7/1929 | Fennell | 35/31 D X |
| 3,212,202 | 10/1965 | Heinichen | 35/31 R |
| 3,339,291 | 9/1967 | Ruchlis | 35/31 R UX |
| 3,521,383 | 7/1970 | Terwilleger | 35/31 D |
| 3,613,268 | 10/1971 | Fowler | 35/31 R |
| 3,629,957 | 12/1971 | Somashekar | 35/19 R |

FOREIGN PATENTS OR APPLICATIONS

| | | | |
|---|---|---|---|
| 163,383 | 6/1949 | Austria | 35/19 R |

*Primary Examiner*—Wm. H. Grieb
*Attorney, Agent, or Firm*—D. A. N. Chase

[57] ABSTRACT

A mathematical balance is disclosed which is of one-piece, molded plastic construction, and which is employed as an aid primarily in the teaching of the basic mathematical operations of addition, subtraction, multiplication and division. One embodiment utilizes a beam provided with a pair of opposed, elongated balance arms having multiple rows of conical recesses extending longitudinally from a central axis or balance line. The basic mathematical operations are performed by placing spherical tokens (such as marbles) of equal weight in the recesses on the opposing arms to produce a balanced condition representing a certain mathematical relationship. Linear scales from 0 to 10 are associated with the recesses to identify numerical values. A second embodiment employs transverse slots or troughs in the balance arms in lieu of the rows of recesses, and cylindrical tokens are used having weights that are in proportion to their lengths. Various cylinder lengths are provided in order to represent whole numbers and fractions, and several tokens may be placed end to end in a single trough to form a desired number. In both embodiments, the construction provides positive centering and retention of the received tokens, and the beam may be balanced utilizing integral feet depending therefrom or a suspension arrangement.

7 Claims, 13 Drawing Figures

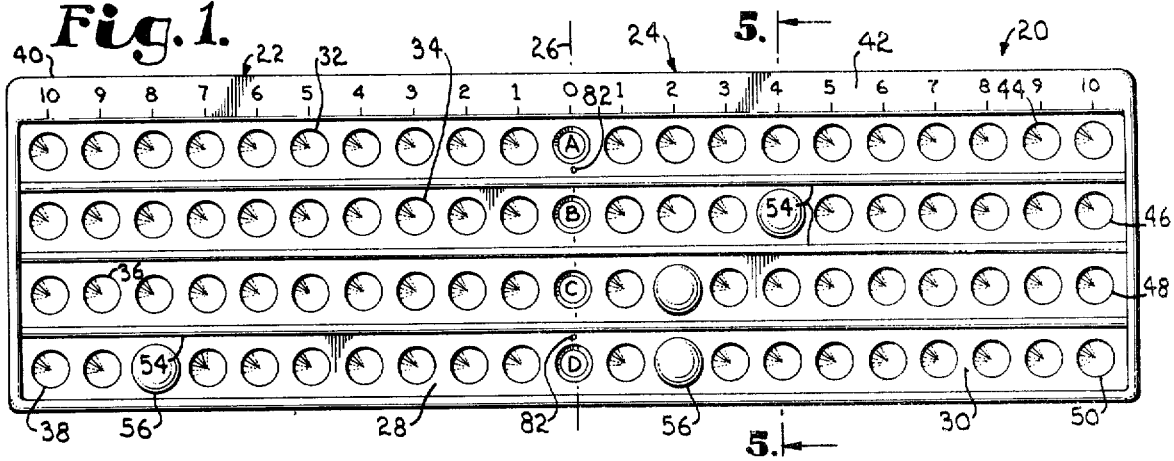
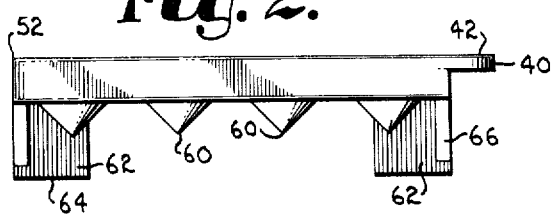
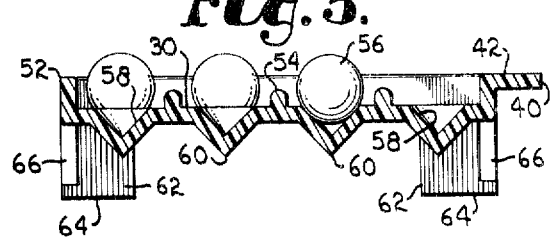
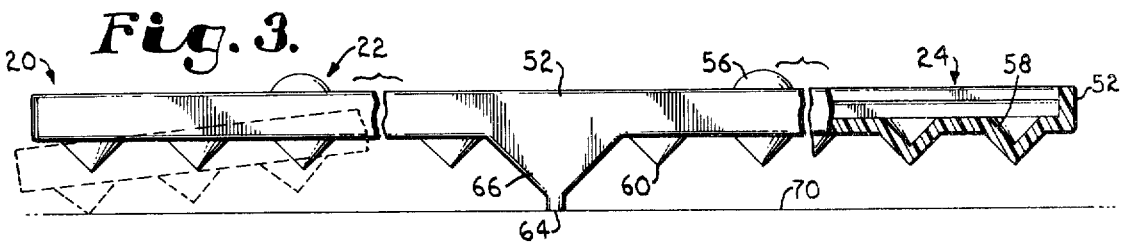
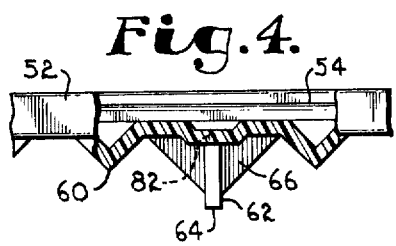
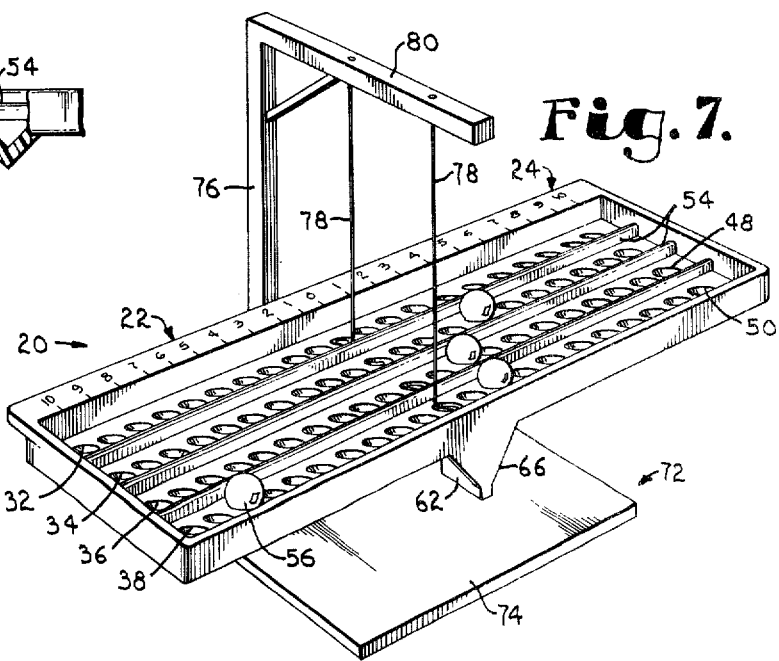
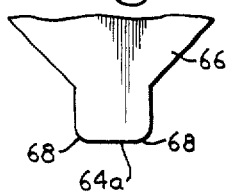

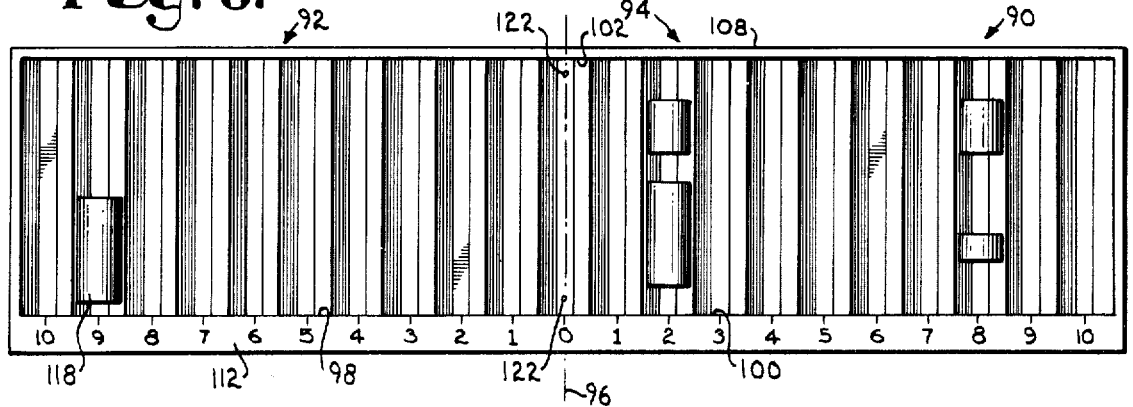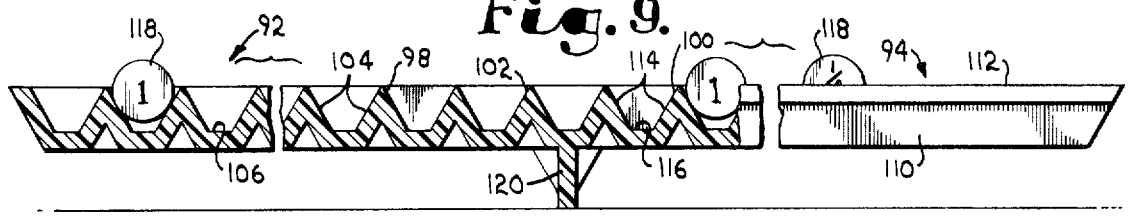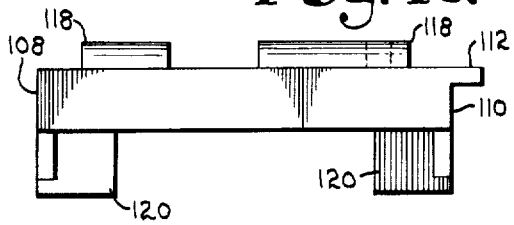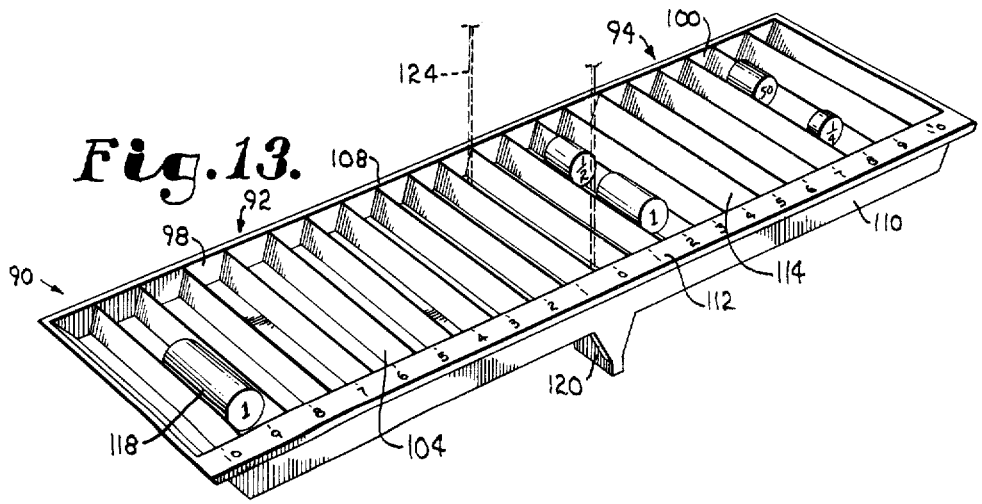

MATHEMATICAL BALANCE

This invention relates to improvements in mathematical balances used as an aid in the teaching of simple addition, subtraction, multiplication and division and, in particular, to a balance of this type having increased versatility to permit a greater number of operations and those of increased complexity to be demonstrated.

A fundamental arithmetic teaching aid of the balance beam type is disclosed in U.S. Pat. No. 3,212,202, which issued to H. W. Heinichen on Oct. 19, 1964. The Heinichen beam is provided with a pair of opposed balance arms, and a row of equally spaced holes extends longitudinally along each arm outwardly from a central origin that is the balance point of the beam. Specially shaped tokens are receivable in the holes, the latter being numbered from 1 to 10 to denote the increments of distance from the origin. Simple arithmetic operations are demonstrated by arranging the tokens such that the beam assumes a balanced condition. For example, tokens in the "2" and the "4" holes on one arm are balanced by a single token in the "6" hole on the opposite arm. Tokens may be stacked to illustrate multiplication.

Although functional and useful for its intended purpose, the Heinichen device has inherent limitations insofar as the demonstration of more complex arithmetic operations is concerned. For example, multiplication and division require the nesting or grouping of a plurality of tokens of special shape associated with a particular hole, and operations involving fractions cannot be demonstrated. From a structural standpoint, the balance is a two-piece unit requiring the interaction of the beam with a fulcrum member, and the tokens must have a special configuration in order to provide for the nesting or grouping thereof in illustrating multiplication and division operations.

It is, therefore, the primary object of the present invention to provide a mathematical balance of increased versatility and usefulness as a teaching aid, particularly in the instruction of children in the principles of mathematics.

Another important object of the invention is to provide a mathematical balance as aforesaid which facilitates the instruction of multiplication and division through the use of multiple rows of possible positions for the tokens on the two balance arms, thereby eliminating the need for specially shaped tokens that are stacked or grouped to illustrate multiplication and division.

Still another important object of the invention is to provide a mathematical balance as aforesaid which is capable of illustrating more complex mathematical operations than those employing whole numbers in simple arithmetic, including computations involving fractions as well as whole numbers in addition, subtraction, multiplication, division and the determination of ratios and unknowns.

Furthermore, it is an important object of this invention to provide balance arms in a mathematical balance capable of utilizing tokens of simple spherical or cylindrical configuration and to provide balance arms that will accommodate one or more cylindrical tokens of varying weights in order to demonstrate operations involving fractions.

Additionally, it is an important object of the invention to provide a mathematical balance which represents problem solutions by assuming a balanced condition when the sum of the moments created in its opposed balance arms is zero, and which is constructed in a manner to assure that each token (particularly the aforesaid spherical or cylindrical tokens) received in a pocket on a respective arm is positively centered with respect to the pocket and retained therein during pivotal movement of the beam to and from the balanced condition.

Yet another important object of the present invention is to provide an improved mathematical balance of one-piece construction having integral feet at its central origin for supporting the beam for movement to and from the balanced condition, and which may alternatively be suspended by strings or the like and utilized in that fashion without need for an underlying support.

A further aid of this invention is to provide a beam as aforesaid which may be readily fabricated from plastic in a molding operation and thereby provided with structural improvements facilitating the achievement of the foregoing objects, including special configurations imparted to the pocket-forming structure and other features of the balance arms as will be apparent in the description to follow. In the drawings:

FIG. 1 is a plan view of one embodiment of the present invention, and shows four spherical tokens positioned to illustrate a combined multiplication and addition operation;

FIG. 2 is an enlarged, end view of the mathematical balance shown in FIG. 1, the tokens being removed from the illustration;

FIG. 3 is a fragmentary, side elevation of the balance of FIG. 1 on an enlarged scale, certain parts being broken away to reveal details of construction and phantom lines being included to show the unbalanced condition;

FIG. 4 is a fragmentary, elevational view similar to FIG. 3 of the central portion of the beam, with parts broken away to reveal the construction of one of the integral feet;

FIG. 5 is a cross-sectional view on an increased scale taken along line 5—5 of FIG. 1;

FIG. 6 is a detail view of a modified form of one of the integral feet;

FIG. 7 is a perspective view of the balance of FIG. 1 showing a suspension arrangement employed as an alternative means of supporting the beam during use thereof; FIG. 8 is a plan view of a second embodiment of the mathematical balance of the present invention, cylindrical tokens being shown in positions illustrating a multiplication and addition operation involving fractions;

FIG. 9 is a fragmentary, enlarged side elevational view of the beam of FIG. 8, aa major portion being broken away to reveal details of construction;

FIG. 10 is an end view of the beam of FIG. 8 on an enlarged scale;

FIGS. 11 and 12 show opposite ends of a cylindrical token, revealing the corresponding decimal and fraction inscriptions thereon; and FIG. 13 is a perspective view of the balance of FIG. 8 illustrating suspension strings in broken lines. The first embodiment of the present invention is illustrated in FIGS. 1-7 and comprises a balance employing a beam broadly denoted by the numeral 20, the latter having a pair of elongated balance arms 22 and 24 extending in opposite directions away from a central origin represented by the transverse center axis or balance line 26. The beam 20 is of unitary, plastic construction and may be formed by injection molding techniques; therefore, the beam 20 is a continuous, one-piece structure throughout its length. The two balance arms 22 and 24 are of identical configuration and, when unweighted, establish the balance point of the beam 20 in the vertical plane of the center axis 26.

The left balance arm 22 has a flat upper surface 28 which is continuous with the flat upper surface 30 of the right balance arm 24 as is particularly clear in the cross-sectional view of FIG. 5. The surfaces 28, 30 lie in a common plane which is horizontally disposed when the beam 20 is in the balanced condition. The surface 28 of the left balance arm 22 has four rows 32, 34, 36 and 38 of uniformly spaced, circular openings therein, each such row constituting a series of longitudinally spaced openings that subdivides the arm 22 into a linear scale ranging from 1 to 10. One of the longitudinal edges 40 of the beam 20 is presented by a flat, marginal ledge 42 upon which the scale numerals 1 through 10 appear, each in transverse alignment with a corresponding set of four openings of the respective rows 32–38. The numeral 0 appears at the center axis 22 in alignment with four shallow, circular indentations marked A, B, C and D respectively.

Likewise, the upper surface 30 of the right balance arm 24 has four rows 44, 46, 48 and 50 of uniformly spaced, circular openings therein extending longitudinally in parallelism and aligned with corresponding rows 32, 34, 36 and 38, respectively, of the arm 22. The numerals 1 through 10 appear along the right-hand portion of the ledge 42 and each is aligned with a set of four corresponding openings of the rows 44–50, the same as previously described with respect to the left balance arm 22.

Particularly in comparing FIGS. 1 and 5, it may be seen that an upstanding, rectangular peripheral rim 52 defines the opposite longitudinal edge of the beam 20 and the end edges thereof, the rim 52 merging with the ledge 42 to form short side and end walls completely circumscribing the beam 20. Three longitudinally extending, parallel, integral ribs 54 project upwardly from the surfaces 28, 30 and extend the length of the beam 20 between adjacent pairs of rows of openings to provide dividers between the aligned rows 32–44, 34–46, 36–48 and 38–50.

As is especially clear in FIG. 5, pockets are formed in the balance arms that communicate with the various circular openings for the purpose of receiving and retaining a spherical token 56 when such token is placed in a selected opening. Four such tokens 56 are illustrated in the embodiment of FIGS. 1–7 and represent the balanced condition that the beam 20 would assume to indicate the solution to the mathematical operation 2 × 2 + 4. The spherical tokens 56 are of equal weight and may comprise marbles of the type used in children's games.

Each of these pockets is defined by an inverted, conical recess 58 which, in effect, presents an internal wall whose surfaces serve to center the received token 56. The recess 58 is a regular conical shape so that the opposed, converging surfaces of the internal wall structure, as viewed in FIG. 5, converge uniformly with increasing pocket depth. Protuberances 60 are formed on the underside of the beam 20 at the various recesses 58 due to the shape of the mold halves utilized to form the beam by injection molding.

A pair of depending feet 62 are integral with the beam 20 at the central origin region and are adjacent the respective longitudinal margins of the beam. Each foot 62 presents an elongated, lowermost surface 64 which extends horizontally in the vertical plane of the center axis 26 but which is of narrow width longitudinally of the beam as may be seen in FIGS. 3, 4 and 7. A triangular reinforcing web 66 is integral with the peripheral rim 52 to provide structural reinforcement for each foot 62. In FIGS. 1–5 and 7, the lowermost surface 64 is flat, whereas in the modified form illustrated in FIG. 6 the surface 64a has rounded longitudinal edges 68 for increased sensitivity of the beam 20 in the balanced condition. The edges 68 may be milled to a radius that gives the desired sensitivity for a particular instructional application. In FIG. 3 the beam 20 is shown in its balanced condition in full lines with the surfaces 64 of the feet 62 resting on a flat, horizontal supporting surface 70, such as the surface of a table or desk. The unbalanced condition (tipped to the left) is illustrated in phantom lines.

Now referring particularly to FIGS. 1, 4 and 7, an alternative means of supporting the beam 20 during use is illustrated. A stand 72 is shown in FIG. 7 and has a base 74 upon which a standard 76 is mounted. Two strings 78 form flexible suspension elements and depend from a horizontal bar 80 supported by the standard 76. A pair of holes 82 are drilled in the beam 20 between the A and D indentions and the adjacent divider ribs 54 and are located exactly in the vertical plane of the center axis 26. Each of the holes 72 receives the lower end of a corresponding string 78, and a knot (not shown) in the end of the string beneath the beam 20 may be used to retain the beam thereon. In lieu of the stand 72, the suspension strings 78 may be hand held if desired.

The second embodiment of the present invention is illustrated in FIGS. 8–13. A beam 90 there shown is similar to the beam 20 previously described in that a pair of elongated balance arms 92 and 94 are provided that extend in opposite directions away from a central origin defined by a center axis or balance line 96. In the embodiment of FIGS. 8–13, the token-receiving openings in the coplanar upper surfaces of the balance arms 92 and 94 are in the form of a series of transverse slots 98 in the arm 92 numbered from 1 to 10 by a linear scale as indicated, and a series of transverse slots 100 in the arm 94 also subdividing the same into a linear scale of from 1 to 10. A single central slot 102 is provided at the region of the central origin and corresponds to 0 as indicated.

The internal wall structure of the left balance arm 92 forms a trough-like pocket within each of the slots 98. As may be seen in FIG. 9, the opposing surfaces 104 within each slot 98 form a trough with sides that uniformly converge with increasing depth, ultimately merging with a relatively narrow, flat bottom surface 106. Side walls 108 and 110 are formed at the parallel, opposed longitudinal edges of the beam 90 and close the ends of the various troughs. A ledge 112 projects from the upper portion of side wall 110 for the purpose of presenting a wider marginal surface at one edge upon which the numerals of the two linear scales may be inscribed.

The ten troughs associated with the numerals 1 through 10 of the right balance arm 94 are likewise each formed within the respective slot 100 by a pair of uniformly converging side surfaces 114 that terminate at a narrow bottom surface 116. Accordingly, each balance arm contains a series of transverse troughs representing the numbers 1 through 10 spaced proportionately from the center axis 96. A trough of the same shape is also formed within the center slot 102.

A plurality of cylindrical tokens 118 are employed with the embodiment of FIGS. 8-13 and are of the same diameter but of varying lengths in order to create fractions as well as whole number values. The various tokens 118 are solid and have the same density; thus, the relative numerical value or weight of each is proportional to the length of the cylinder. As will be appreciated, the various troughs are of sufficient length to permit several tokens to be placed therein in order to represent more complex mathematical operations. For instruction purposes and for the convenience of the user, each token 118 is inscribed on its ends with the appropriate numerical value and, in the case of fractions, the decimal equivalent may also be inscribed. This is illustrated in FIGS. 11 and 12 where the opposite ends of a token having a value of one-half are shown.

As in the first embodiment, a pair of integral feet 120 depend from the beam 90 in the region of the center axis 96 and are located adjacent the opposed longitudinal edges of the beam, such feet 120 functioning in the same manner as discussed hereinabove with respect to the first embodiment. Alternatively, a string suspension may be employed as provided for by two holes 122 centered in the bottom of the trough formed within the central slot 102 and through which suspension strings 124 (FIG. 13) may be threaded.

In use, referring first to the embodiment of FIGS. 1-7, the balance as illustrated represents the solution to the problem 2 × 2 + 4. Utilizing tokens 56 of equal weight, two such tokens are illustrated in two of the "2" openings of balance arm 24 (specifically, those openings in rows 48 and 50). A third token 56 is located in the "4" opening of row 46. As previously discussed and as is evident from viewing FIG. 1, the centers of the various openings of the rows are located at distances from the center axis 26 that are directly proportional to the corresponding numerical values of the associated linear scale. Accordingly, using either the feet 62 or the strings 78 for support, a moment tending to tip the beam 20 to the right is created by two tokens 56 acting through a lever arm having a length represented by the number 2, plus the token 56 in row 46 acting through a lever arm having a length represented by the number 4.

It should be noted at this juncture that the use of four rows of openings in each balance arm 22 and 24 makes the mathematical balance of the present invention especially adapted to the teaching of the principles of multiplication since, as in the illustration, the students can readily visualize 2 × 2 due to the presence of two token in an adjacent pair of openings. Manifestly, a greater number of rows may be used if desired, and the linear scales can be expanded to attain an increased range.

In the illustration herein, the left balance arm 22 has one token 56 thereon at the "8" opening of row 38, thereby counterbalancing the right balance arm 24 so that the sum of the moments about the axis 26 is zero. Therefore, the student is shown that 2 × 2 + 4 = 8 since, unless the token 56 on the left balance arm 22 is in one of the openings, the beam 20 will not assume the balanced condition.

From the foregoing, it may be understood that simple addition, subtraction, multiplication and division may be readily taught through the use of the present invention as an instructional aid. The mathematical balance gives a clear concept of the meaning of equations by appropriate placement of the tokens 56 in the numbered openings. Furthermore, the mathematical balance can also be utilized to determine the ratio of the weight of one token 56 to another, through the use of tokens of different weights (the ratio of which is initially unknown to the student). Accordingly, given the weight of one token the student can determine the weight of another token (unknown) by computation after placement of both tokens on opposite arms 22 and 24 at positions which cause the beam 20 to assume the balanced condition.

It is important in the various operations to be performed by the mathematical balance that the various tokens are properly centered in the selected openings. Without proper centering, the lever arms are not consistent and this could adversely affect a problem solution particularly when a delicate balance is used (such as provided by the string suspension members 78). The internal wall structure at each opening presented by the conical recesses 58 effects the requisite centering due to the action of the opposed, converging surfaces best illustrated in FIG. 5. Since the internal wall is circumferentially continuous by virtue of the conical configuration, it may be appreciated that opposing, converging surfaces exist viewing the recess 58 in vertical cross-section from any direction; thus, a uniform holding as well as centering action is produced. Accordingly, the tapered pockets thus formed within the various openings permit simple, spherical tokens to be utilized in the present invention, and yet these are centered and positively retained in place as the beam 20 tips or pivots to and from the balanced condition. The peripheral rim 52 projecting above the common plane of the surfaces 28 and 30 serves to retain the spherical tokens 56 on the beam 20 in the event that they become dislodged during use of the balance when the beam is in an extreme off-balance condition.

In the second embodiment of the invention illustrated in FIGS. 1-13, the two series of slots 98 and 100 in the balance arms 92 and 94 replace the rows of openings in the first embodiment and provide a unique capability due to the attendant use of the cylindrical tokens 118 of various lengths (weights). A set of cylindrical tokens 118 is preferably provided having cylinders graduated in length to represent fractions of a single unit weight, and multiples thereof if desired. For example, besides representing the whole number 1, cylinders of lesser length in the set could include those that represent ½, ⅓, ¼, 1/5, 1/6, etc. As a further aid to instruction, these common fractions are accompanied by their decimal equivalents as illustrated by the inscriptions on the opposite ends of the cylinder representing ½ as seen in FIGS. 11 and 12. The various cylinders would be cast or molded of a solid material of the same density so that, with equal diameters, the lengths of the cylinders are proportional to their weights and give a further visual indication of their relative values.

The width of the beam 90, and hence the lengths of the troughs formed within the slots 98 and 100, is sized to be capable of receiving several of the tokens 118 to permit various number combinations to be illustrated. For example, viewing FIGS. 8 and 13, it may be seen that the "1" and "½" cylinders are placed in the trough in the right balance arm 94 corresponding to the number 2 on the linear scale. The ½ and "¼" cylinders are in the trough corresponding to 8 on the scale. To solve this problem, the student must multiply 1½ by 2 and then add the product of ¾ and 8. The answer is 9, which will be shown to be correct when the student places the cylinder in the trough in the left balance arm 92 corresponding to the numeral 9 on the scale. Or, the student could have used other combinations of cylinders in the troughs in the left balance arm 92 to achieve the balanced condition (indicating the correct answer), so long as the lever arm or arms and selected weight or weights yielded the equivalent of 9 on the scale.

As in the first embodiment, the angular wall surfaces 104 and 114 of the troughs 98 and 100 respectively provide automatic centering of tokens placed in the selected slots, particularly tokens of spherical or cylindrical configuration having diameters slightly less than the width of the slots as illustrated. These converging internal wall surfaces also serve to retain the tokens in place in the selected troughs, and the sidewalls 108 and 110 of the beam 90 prevent the tokens from inadvertently escaping from the ends of the troughs during manipulation of the balance device. The presence of the sidewalls 108 and 110 is particularly important in instances where it may be desired to use spherical tokens of equal weight, such as marbles as in the first embodiment, in lieu of the graduated cylindrical tokens, in which case each trough would be able to accommodate a plurality of spherical tokens side by side in the trough to a maximum number depending upon the width of the beam 90.

Having thus described the invention, what is claimed as new and desired to be secured by Letters Patent is:

1. In a mathematical balance:
   a beam having a pair of elongated balance arms extending in opposite directions away from a central origin, and further having a pair of spaced longitudinal edges,
   each of said arms being provided with an upper surface having a longitudinally extending row of uniformly spaced engagement zones,
   said zones subdividing each arm into a linear scale having numerical values associated with the zones that increase with increasing distance from said origin, the distance from said origin to each zone defining a lever arm having a length representing the associated numerical value;
   a plurality of tokens of predetermined weight, each configured for engagement with a selected zone; and
   means connected to said beam at said origin and suspending the beam for movement to and from a balanced condition in response to the selective positioning of said tokens at said zones, whereby the beam assumes said balanced condition when the tokens thereon are positioned to equalize the sum of the moments about said origin created by the weights thereof acting through the associated lever arms,
   said suspending means including a pair of flexible suspension elements connected with said beam adjacent corresponding edges, and a stand supporting said elements above said beam.

2. In the balance as claimed in claim 1, wherein said beam has a pair of transversely spaced holes therethrough at said origin, and wherein each of said elements extends upwardly through a corresponding hole.

3. In a mathematical balance:
   a beam having a pair of elongated balance arms extending in opposite directions away from a central origin,
   each of said arms being provided with an upper surface having a longitudinally extending row of uniformly spaced, transverse troughs therein,
   said troughs subdividing each arm into a linear scale having numerical values associated with the troughs that increase with increasing distance from said origin, the distance from said origin to each trough defining a lever arm having a length representing the associated numerical value;
   a plurality of tokens of different predetermined weights each adapted to be received within a selected trough, and each of said troughs being of sufficient length to accommodate more than one of said tokens arranged therein along the length thereof,
   each of said troughs having a pair of sides presenting opposed, inclined internal wall surfaces converging with increasing depth of the trough and disposed to cause tokens received therebetween to be uniformly centered and held; and
   means supporting said beam at said origin for movement to and from a balanced condition in response to the selective positioning of said tokens in said troughs, whereby the beam assumes said balanced condition when the tokens thereon are positioned to equalize the sum of the moments about said origin created by the weights thereof acting through the associated lever arms.

4. In the balance as claimed in claim 3, wherein each of said tokens is of cylindrical configuration, and has a length proportional to the weight thereof.

5. In the balance as claimed in claim 4, wherein indicia is provided on said tokens indicating the relative numerical value thereof according to weight.

6. In the balance as claimed in claim 3 wherein each of said tokens is of circular cross-sectional configuration.

7. In the balance as claimed in claim 3, wherein said beam has a pair of spaced longitudinal edges between which said troughs extend, said edges presenting wall means closing said troughs at their ends.

* * * * *